United States Patent
Fan et al.

(10) Patent No.: US 6,224,043 B1
(45) Date of Patent: May 1, 2001

(54) DOWNCOMERS FOR VAPOR-LIQUID CONTACT TRAYS

(75) Inventors: Zhongliang L. Fan, Carrollton; Michael J. Binkley, Glenn Heights, both of TX (US)

(73) Assignee: Koch-Glitsch, Inc., Wichita, KS (US)

( * ) Notice: Subject to any disclaimer, the term of this patent is extended or adjusted under 35 U.S.C. 154(b) by 0 days.

(21) Appl. No.: 09/148,353

(22) Filed: Sep. 4, 1998

Related U.S. Application Data

(60) Provisional application No. 60/058,350, filed on Sep. 10, 1997, now abandoned.

(51) Int. Cl.⁷ ..................................................... B01F 3/04
(52) U.S. Cl. ..................................... 261/114.1; 261/114.5
(58) Field of Search .......................... 261/114.1, 114.2, 261/114.3, 114.4, 114.5; 202/158; 203/99

(56) References Cited

U.S. PATENT DOCUMENTS

| | | | |
|---|---|---|---|
| 2,875,867 | * 3/1959 | Hart | 261/114.1 |
| 4,504,426 | 3/1985 | Chuang et al. | 261/114 |
| 4,528,068 | 7/1985 | Fiocco et al. | 196/14.52 |
| 4,954,294 | 9/1990 | Bannon | 261/114.1 |
| 5,213,719 | 5/1993 | Chuang | 261/114.1 |
| 5,453,222 | 9/1995 | Lee | 261/114.1 |
| 5,593,548 | 1/1997 | Yeoman et al. | 203/29 |

FOREIGN PATENT DOCUMENTS

| | | | |
|---|---|---|---|
| 764 103 | 9/1952 | (DE) . | |
| 1 801 538 | 6/1970 | (DE) . | |
| 0 635 292 A1 | 1/1995 | (EP) . | |
| 823610 | 1/1960 | (GB) . | |
| 1057048 | * 11/1983 | (SU) | 261/114.1 |
| 002092075 | 6/1986 | (SU) . | |
| 1237226 | * 6/1986 | (SU) | 261/114.1 |

* cited by examiner

Primary Examiner—C. Scott Bushey
(74) Attorney, Agent, or Firm—Shook, Hardy & Bacon L.L.P.

(57) ABSTRACT

A vapor-liquid contact tray (36) is provided with a tray deck (40) and an upstream downcomer (48) and a downstream downcomer (50) positioned at an opening (46) in the tray deck (40). The upstream downcomer (48) extends downwardly and is inclined in the direction of the upstream downcomer (48).

17 Claims, 7 Drawing Sheets

DOWNCOMERS FOR VAPOR-LIQUID CONTACT TRAYS

CROSS-REFERENCE TO RELATED APPLICATIONS

This application claims the benefit of U.S. Provisional Application Nos. 60/058,350 filed on Sep. 10, 1997, now abandoned.

STATEMENT REGARDING FEDERALLY SPONSORED RESEARCH

Not applicable.

BACKGROUND OF THE INVENTION

This invention relates in general to mass transfer and exchange columns and, more particularly, to downcomers used in association with vapor-liquid contact trays employed in such columns.

Vapor-liquid contact trays are used in mass transfer or heat exchange columns to facilitate interaction and mass transfer between descending liquid streams and ascending vapor streams. The trays are generally horizontally disposed and vertically spaced apart within an open interior region of the column. Each tray typically includes a flat deck portion that includes a plurality of vapor flow apertures that allow ascending vapor to pass through the tray deck and interact with liquid flowing across the upper surface of the tray deck. A downcomer is positioned at an opening at an outlet end of the tray deck to remove liquid from the deck and direct it downwardly to a liquid receiving area at the inlet end of an underlying tray. The liquid then flows across the tray deck of the underlying tray, interacts with vapor passing through the tray deck, and then flows downwardly through the associated outlet downcomer to the next underlying tray. This flow pattern is then repeated for each successively lower tray.

In conventional columns where high liquid flow rates are encountered, it has been suggested in U.S. Pat. No. 5,213,719 that a second downcomer can be used on each tray to increase the liquid handling capacity of the tray and thereby reduce the opportunity for flooding of the downcomer to occur. The second downcomer, referred to as the upstream downcomer, is positioned adjacent to the downstream downcomer and is shorter than the downstream downcomer in vertical length. FIG. 1, taken from U.S. Pat. No. 5,213,719, illustrates this downcomer construction with the upstream downcomer 10 and downstream downcomer 12 positioned at the outlet end of the tray deck 14.

It has also been suggested, in U.S. Pat. No. 5,453,222, that the normally planar downcomer inlet wall can be shaped in a semi-conical fashion to form a vapor tunnel along the undersurface of the semi-conical wall. The vapor tunnel imparts a horizontal flow vector to the vapor stream and facilitates disengagement of liquid from the vapor stream. FIGS. 2 and 3 are taken from U.S. Pat. No. 5,453,222 and illustrate a tray 16 with a downcomer 18 having a semi-conical inlet wall 20. Venting chambers 22 positioned in the liquid receiving trough 24 on the underlying tray 26 allow vapor to flow through the chambers 22 for upward passage through the overlying vapor tunnel 28 formed by the semi-conical downcomer inlet wall 20.

It would be desirable to combine the advantages afforded by the double downcomer disclosed in the above-mentioned U.S. Pat. No. 5,213,719 with those provided by a downcomer with a semi-conical inlet wall as taught by U.S. Pat. No. 5,453,222 discussed above. Several problems, however, would result from such a combination because the upstream downcomer would need to be of a relatively short vertical dimension so that it does not protrude downwardly into the vapor tunnel and interfere with the desired flow of vapor through the vapor tunnel. If a relatively short upstream downcomer is used, liquid issuing from the bottom of the upstream downcomer would be discharged directly into the vapor stream flowing along the vapor tunnel. The momentum of the vapor stream would cause the discharged liquid to be blown away from the downcomer and across the tray. The vapor-liquid contact and energy and mass exchange occurring in such blowing liquid as it moves through the vapor is not as good as is to be desired. In addition, the blown liquid would bypass portions of the tray deck and would not experience the vapor-liquid interaction that would otherwise occur if the liquid flowed completely across the tray deck. Therefore, it is desirable to minimize or eliminate this effect.

Another untoward effect which may occur as a consequence of utilizing an upstream downcomer is it may "starve" liquid flow from the downstream or primary downcomer under low flow conditions. A further consequence of this effect is that the downstream downcomer may have too little liquid flowing through it and it may lose the liquid seal at the bottom region of the downcomer that blocks undesired entry of vapor into the downcomer. Loss of the liquid seal will allow vapor to flow upwardly through the downcomer and bypass interaction with liquid on the overlying tray. The possibility that such an effect will occur decreases the operating flexibility of the column taken as a whole.

A still further undesirable result from the use of an upstream downcomer of small vertical extent is that liquid issuing from the bottom of the upstream downcomer falls in free-fall vertically downward to the tray deck below. The large momentum of the falling liquid is transmuted into pressure when the liquid hits the tray below and locally depresses the vapor flow in the impact area and, in consequence, allows the liquid to weep through the vapor apertures at that point in the tray deck.

While the foregoing undesirable effects of utilizing an upstream downcomer of short vertical extent have been described in connection with a downcomer system utilizing a vapor tunnel structure, those skilled in the art will appreciate that these undesirable effects can also be encountered when the upstream downcomer is of slight vertical extent, even if there is no vapor tunnel. It would thus be desirable to overcome these disadvantages in a double downcomer system.

BRIEF SUMMARY OF THE INVENTION

It is an object of this invention to provide a vapor-liquid contact tray with a double downcomer constructed in a manner that does not completely block the desired vapor flow pattern in the area of the downcomer, but is able to at least partially shield the liquid discharged from the upstream portion of the downcomer so that the vapor flow does not carry the discharged liquid away from the downcomer and thereby interfere with the desired vapor-liquid interaction in the vicinity of the downcomer.

It is also an object of this invention to provide a double downcomer that does not completely block the desired vapor flow pattern and in which the upstream portion of the downcomer chokes the flow of liquid so that it can accumulate within the upstream portion of the downcomer and flow into the downstream portion of the downcomer even under low liquid flow conditions, thereby creating the liquid seal necessary to resist upward vapor flow through the downstream portion of the downcomer.

It is a further object of this invention to provide a double downcomer as described that does not completely block the desired vapor flow pattern but is able to discharge liquid near the surface of the underlying tray deck in a manner that disrupts the downward momentum of the liquid to reduce the incidence of liquid weeping through the vapor flow apertures on the tray deck as a result of such downward momentum.

To accomplish these and other related objects of the invention, a vapor-liquid contact tray is provided, comprising a tray deck having an opening for removing liquid from an upper surface of the tray deck and a plurality of apertures for allowing vapor to flow upwardly through the tray deck to interact with said liquid on the upper surface. An upstream downcomer is provided and extends downwardly at the opening in the tray deck and has an inlet at an upper end to receive at least a portion of the liquid entering the opening from the tray deck and a lower discharge outlet through which at least part of the portion of the liquid exits the upstream downcomer. A downstream downcomer is also provided and extends downwardly at the opening in the tray deck and has a lower discharge outlet through which a second portion of liquid exits the downstream downcomer. A partition wall separates the downstream downcomer from the upstream downcomer along at least a portion of their lengths and an inlet wall which defines a portion of the upstream downcomer is inclined downwardly toward the partition wall.

In another aspect, the invention is directed to a method of utilizing the vapor-liquid contact trays to facilitate vapor-liquid interaction. The inclined upstream downcomer discharges liquid in the direction of the downstream downcomer to reduce the vertical force at which the liquid impacts the tray deck, to facilitate mixing of the liquid with the discharge from the downstream downcomer, and to impede entry of vapor into the discharge outlet of the downstream downcomer.

BRIEF DESCRIPTION OF THE SEVERAL VIEWS OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
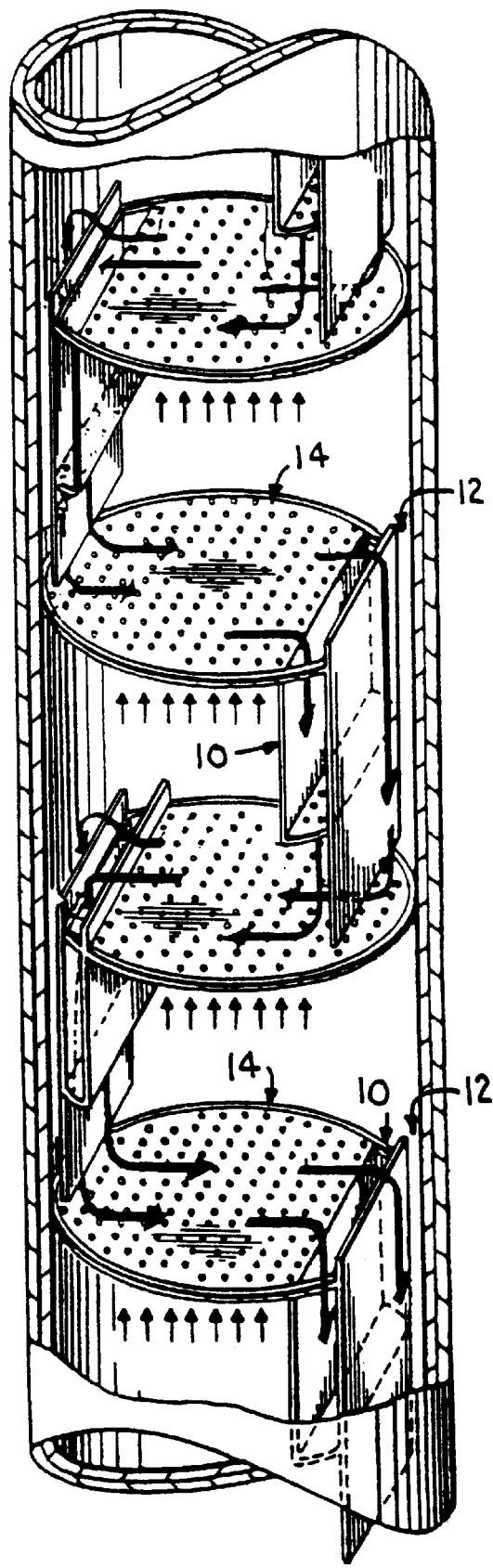
FIG. 1 is a fragmentary perspective view of a prior art mass transfer column employing vapor-liquid contact trays having double downcomers of the type illustrated in U.S. Pat. No. 5,213,719.
Figure 2:
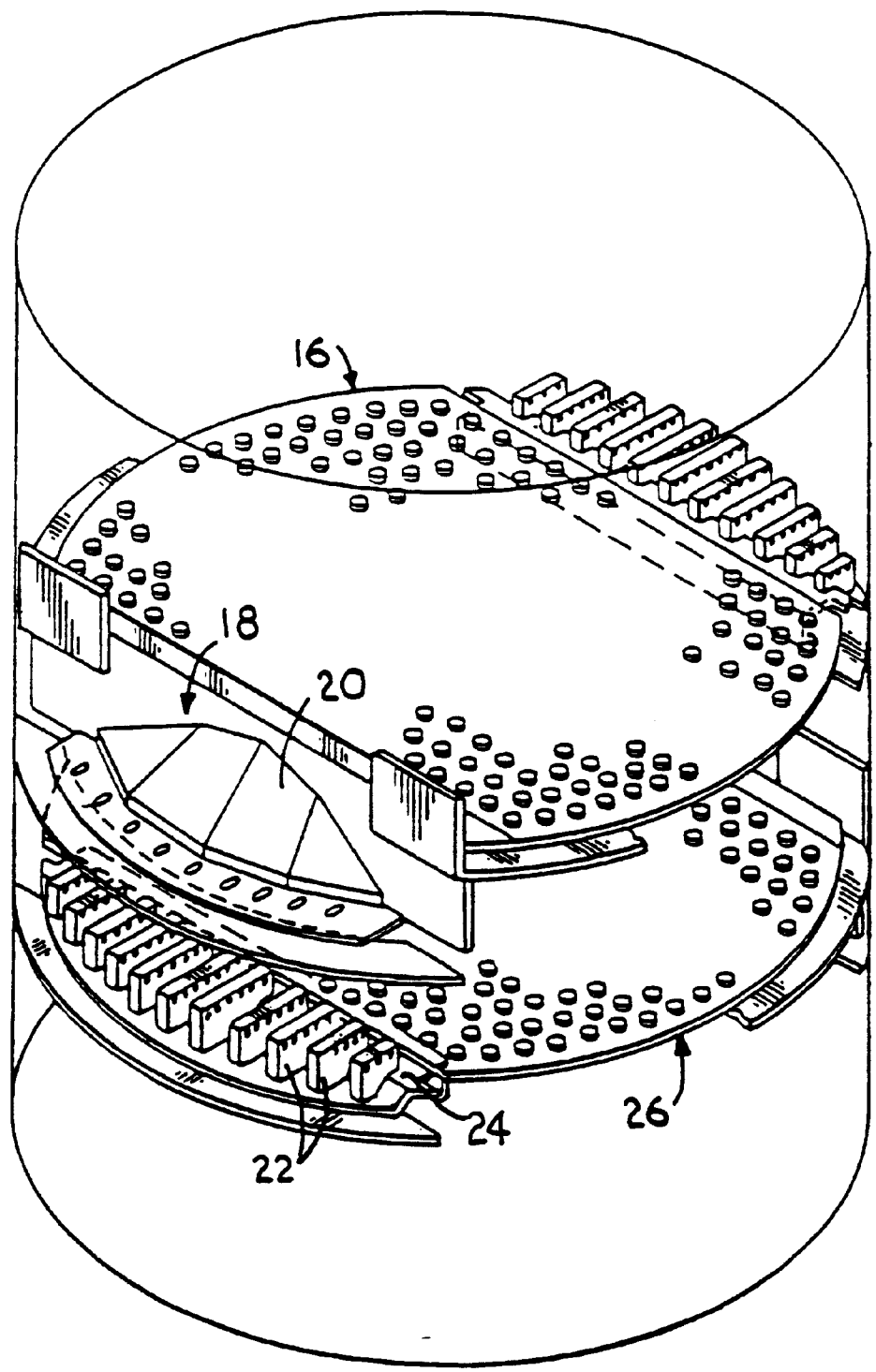
FIG. 2 is a fragmentary perspective view of a prior art mass transfer column employing a vapor-liquid contact tray having a downcomer with a frusto- or semi-conical wall that forms a vapor tunnel to facilitate the upward flow of vapor, all as illustrated in U.S. Pat. No. 5,453,222.
Figure 3:
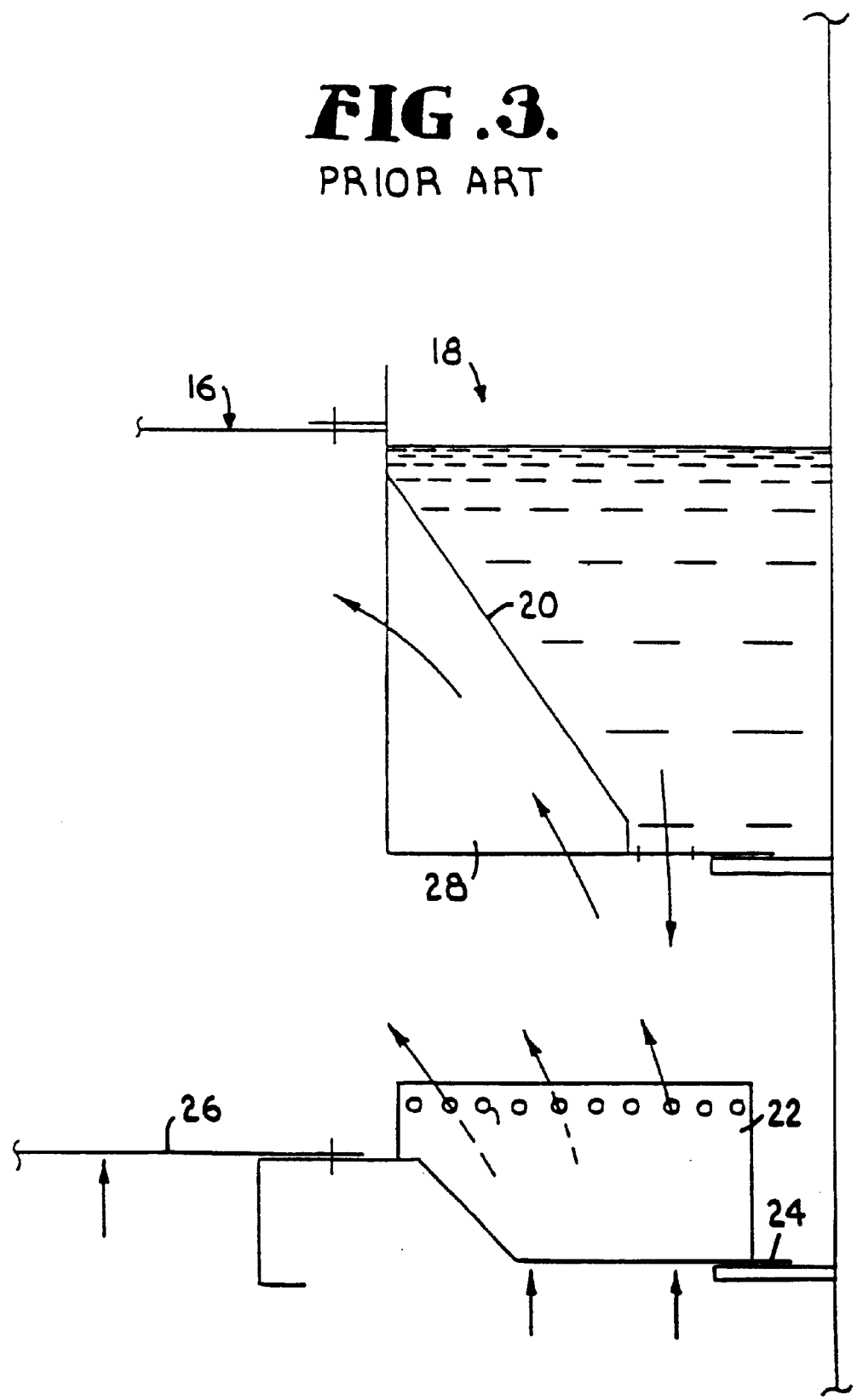
FIG. 3 is a enlarged, fragmentary side elevation view, taken in vertical section, of the prior art contact tray shown in FIG. 2 illustrating the vapor and liquid flow patterns.
Figure 4:
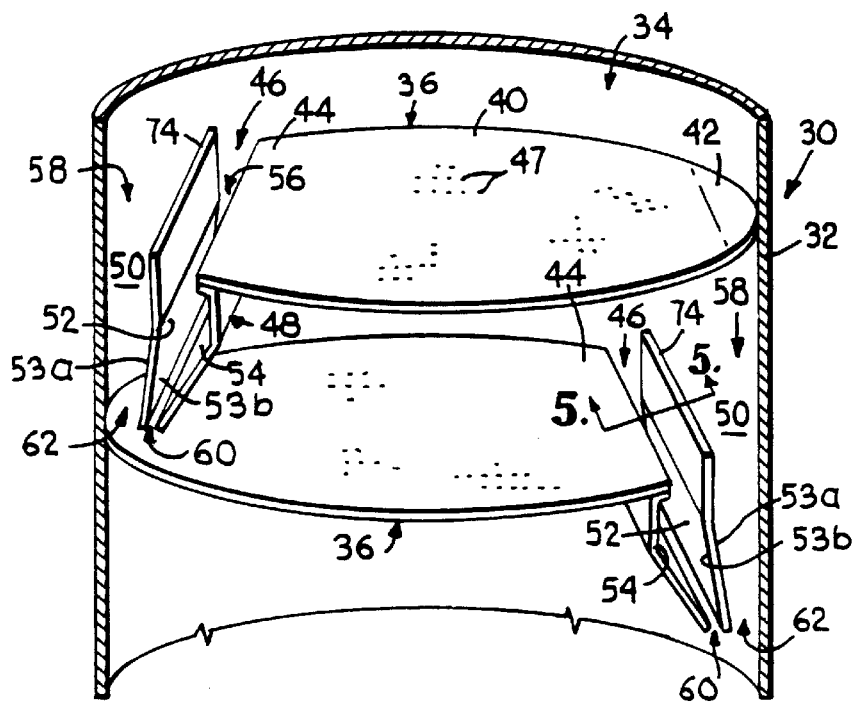
FIG. 4 is a fragmentary perspective view of a column containing single pass trays constructed according to the present invention and having inclined planar downcomer inlet walls.
Figure 5:
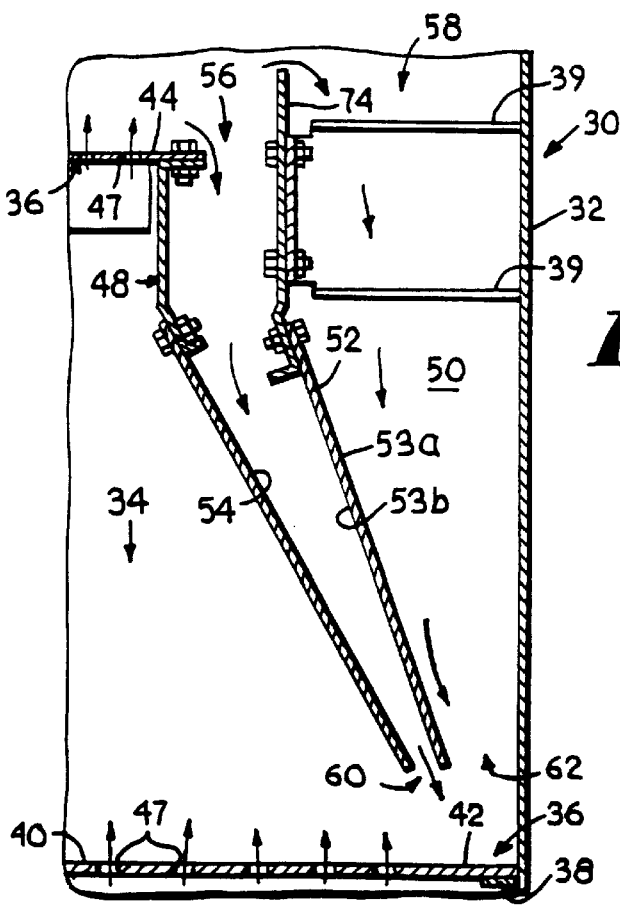
FIG. 5 is a fragmentary side elevation view showing one of the trays of FIG. 4, taken in vertical section along line 5—5 of FIG. 4.

Turning now to the drawings in greater detail, and initially to FIGS. 4–5, a mass transfer or heat exchange column is generally designated by the numeral 30 and includes an upright cylindrical shell 32 that defines an open interior region 34 in which a plurality of vapor-liquid contract trays 36 are contained. Column 30 is of a type used for processing liquid streams and, optionally, vapor streams, typically to obtain fractionation products. Although column 30 is shown in a cylindrical configuration, other shapes, including polygonal, may be used. The column 30 can be of any suitable diameter and height selected for particular applications and can be constructed from any suitably rigid material.

One or more liquid streams can be directed to the column 30 through side stream feed lines and an overhead reflux return line which are not shown in the drawings because of their conventional nature. Likewise, one or more vapor streams can be charged to the column through side stream feed lines (not shown) or can be generated within the column 30. Other conventional aspects of mass transfer columns, such as beds of packing, liquid distributors and collectors, reboilers, condensers and the like are not illustrated but can be included in column 30 to carry out the desired processing of the liquid and vapor streams as they flow in countercurrent relationship through the column.

The vapor-liquid contact trays 36 are placed in vertically spaced apart relationship within the interior region 34 of the column 30 and are supported in a generally horizontal orientation by support rings 38 and, optionally, brackets 39 mounted on the inner surface of the column 30. Each tray 36 includes a tray deck 40 having an inlet end 42 where liquid is introduced onto the tray deck 40 and an outlet end 44 where liquid is removed from the tray deck through an opening 46 in the deck. Apertures 47 are uniformly distributed across the portion of the tray deck known as the "active area." The apertures 47 permit vapor to pass through the tray deck and interact with liquid flowing across the upper surface of the deck. The apertures 47 may comprise holes, valve structures or other conventional fractionation tray apertures and have a size, shape and distribution for the particular operating conditions in which the tray 36 will be utilized. Apertures 47 are typically omitted from the liquid receiving portion of the inlet end 42 of the tray deck 40, but may be present if desired.

At least one, and preferably a plurality, of the trays 36 include an upstream downcomer 48 positioned in the opening 46 at the outlet end 44 of the tray deck 40 and a downstream downcomer 50 positioned adjacent to and downstream from the upstream downcomer in the tray deck opening 46. The downcomers 48 and 50 extend downwardly below the tray deck a preselected distance toward the underlying tray. A partition wall 52 separates the upstream and downstream downcomers 48 and 50 along at least a portion of their lengths and forms at least a portion of an inlet wall 53a for the downstream downcomer and at least a portion of a downstream wall 53b for the upstream downcomer. The partition wall 52 may be a single wall that serves as a common wall for both downcomers or it may be a double, spaced apart wall that permits the w downcomers to be spaced apart if desired. The upstream downcomer 48 is also formed in part by an inlet wall 54 that is preferably inclined downwardly in the direction of the partition wall 52 and inlet wall 53a for the downstream downcomer 50. The remaining walls of the downcomers are formed by the column shell 32, but separate walls can be used if desired.

The upstream and downstream downcomers 48 and 50 cooperate to remove liquid from the outlet end 44 of the tray deck 40 and direct it downwardly to the inlet end 42 of the underlying tray deck. Both downcomers 48 and 50 have an upper inlet 56 and 58, respectively, through which liquid enters the open top of the downcomer for downward passage therethrough and a lower discharge outlet 60 and 62, respectively, through which liquid is discharged onto the liquid receiving portion of the inlet end 42 of the underlying tray deck 40. The discharge outlets 60 and 62 are preferably positioned at or slightly below the liquid level on the underlying tray deck 40. The vertical spacing between outlets 60 and 62 and the underlying tray deck can be the same as shown in FIGS. 5 and 7. Alternatively, the downstream downcomer discharge outlet 62 can be spaced above the upstream downcomer discharge outlet 60 and above the liquid level on the underlying tray as shown in FIG. 6, or the upstream discharge outlet 60 could be positioned above the downstream downcomer discharge outlet 62.

In accordance with the present invention, the inlet wall 54 of the upstream downcomer 48 is inclined downwardly in the direction of the inlet wall 53a of the downstream downcomer. The inlet wall 53a is optionally, but preferably, inclined in the same direction as the upstream downcomer inlet wall 54. Inclination of the inlet walls 53a and 54 in this manner reduces the total horizontal cross-sectional area of the downcomer discharge outlets 60 and 62 in relation to the upper inlets 56 and 58, thereby reducing the size of the liquid receiving area on the inlet end 42 of the underlying tray deck 40 and allowing for greater active area and more area for vapor flow above the tray deck. The decreased cross-sectional area of the outlets 60 and 62 also allows the upstream downcomer to extend downwardly to just above the underlying tray deck 40 so that the exiting liquid is shielded from the vapor stream and is not blown across the tray. Notably, the extended length of the upstream downcomer 48 in combination with the decreased cross-sectional area of the discharge outlets 60 and 62 allows the exiting liquid to be delivered directly onto an unperforated liquid receiving area on the inlet end 42 of the underlying tray deck 40, thereby reducing the opportunity for the liquid to depress vapor flow and cause weeping of the liquid through the tray deck. The inclination of the upstream downcomer inlet wall 54 also causes the liquid to be discharged with a substantial momentum vector in the direction of the downstream downcomer 50 rather than directly downward onto the tray deck 40. This directional discharge facilitates mixing of the liquid discharged from both downcomers and can form a curtain of liquid that shields the downstream downcomer discharge outlet 62 from undesired entry of vapor, particularly under low liquid flow conditions.

It can be appreciated that when the downcomer inlet walls 53a and 54 are inclined at the same angle, only the downstream downcomer discharge outlet 62 will have a smaller cross-sectional area than its upper inlet 58, but the total area of both outlets 60 and 62 will nonetheless be less than the total area of the inlets 56 and 58. Preferably, however, the angle of inclination of the upstream downcomer inlet wall 54 is greater than the downstream downcomer inlet wall 53a so that the outlet 60 of the upstream downcomer also has a smaller cross-sectional area than its inlet 56. This reduction in cross-sectional area for the upstream downcomer provides the further advantage of choking the downward flow of liquid through the upstream downcomer 48 to facilitate accumulation of liquid within the upstream downcomer.

Figure 6:
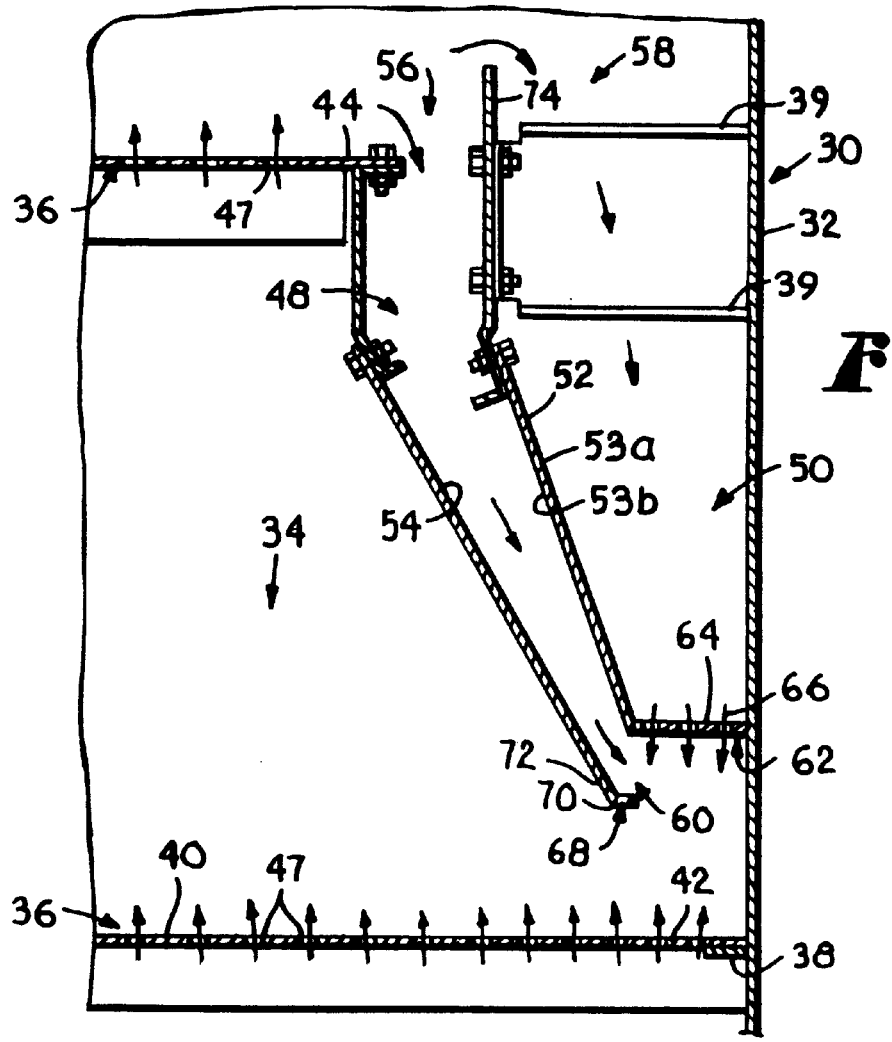
FIG. 6 is a fragmentary side elevation view similar to that shown in FIG. 5, but showing an alternate embodiment of the single pass tray.
Figure 7:
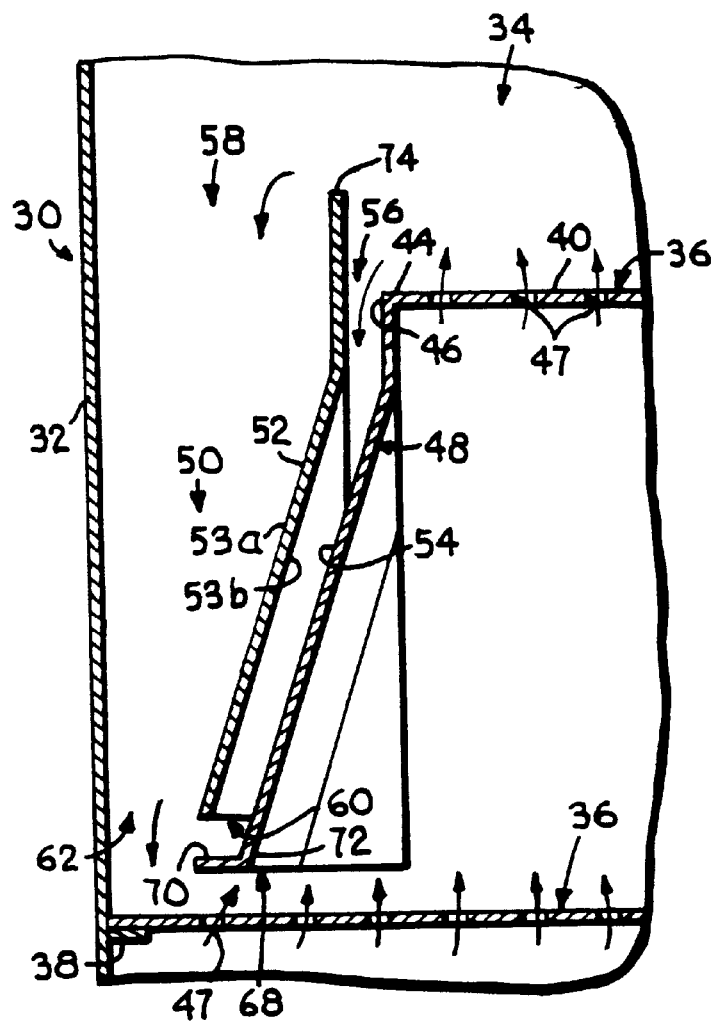
FIG. 7 is a fragmentary side elevation view showing another embodiment of a single pass tray having semi-conical downcomer inlet walls.
Figure 8:
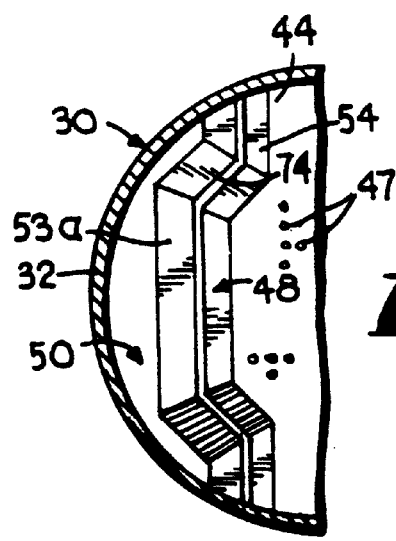
FIG. 8 is a fragmentary top plan view showing a further embodiment of a single pass tray having inclined downcomer inlet walls that are multi-segmented chordal in construction.

The downcomer inlet walls 53a and 54 can be planar as illustrated in FIGS. 4–6, semiconical as shown in FIG. 7, curved, or multi-segmental chordal as shown in FIG. 8. Other configurations and combinations are possible, such as a vertical planar downstream downcomer wall 53a and an inclined planar upstream downcomer wall 54. This is contemplated by and within the scope of the invention.

If desired, an optional perforated plate 64 can close the discharge outlet 60 of the downstream downcomer 50 as shown in FIG. 6. The plate 64 can be perforated with openings 66, apertures, slots, directional louvres, or other desired features. Alternatively, the plate 64 can comprise a number of overlapping plate segments that form a plurality of discharge openings in the spacing between the plate segments.

As shown in FIGS. 6 and 7, an optional L-shaped hood or deflector 68 extending downwardly below the upstream downcomer discharge outlet 60 can be provided if desired. A horizontally extending portion 70 of the deflector 68 is aligned with the discharge outlet 60 and is sized to deflect the vertically downward momentum of a substantial portion or all of the liquid issuing from the discharge outlet 60. By deflecting the falling liquid in this manner, the force at which the liquid hits the tray below is reduced and liquid is less likely to weep through the vapor apertures at that point in the tray deck. A vertically extending portion 72 of the deflector 68 is positioned to shield the discharged liquid from the prevailing vapor flow and thereby reduce the opportunity for the vapor to blow the liquid across the tray and bypass vapor interaction along portions of the tray deck. The vertical portion 72 can be positioned between the discharge outlets 60 and 62 and can be formed by a downward extension of the partition wall 52. Alternatively, the vertical portion 72 of the deflector 68 can be placed on the opposite side of the outlet 60 and can be formed by a downward extension of the inlet wall 54 of the upstream downcomer.

It will be appreciated that the objectives of shielding the discharged liquid from vapor flow and disrupting the downward momentum of the discharged liquid can be achieved using curved, multi-segmented or other shaped deflectors instead of the L-shaped deflector illustrated in FIGS. 6 and 7. In addition, the vertical portion 72 of the deflector 68 could be omitted, such as in those applications where the discharge outlet 60 is close enough to the underlying tray deck 40 so that the liquid is discharged directly into the liquid stream flowing from the downstream downcomer discharge outlet 62. The horizontal portion 70 of deflector 68 also could be formed separately from the vertical portion 72 and supported by brackets attached to the column shell 30, the underlying tray deck 40, or other internal components. The foregoing variations are contemplated by and within the scope of the present invention.

A weir 74 separates the downcomer inlets 56 and 58 and causes liquid to fill the upstream downcomer 48 and accumulate to a preselected depth on the tray deck 40 before it overflows the weir and enters the downstream downcomer 50. Alternatively, the weir 74 may be omitted or positioned at the edge of the outlet end 44 of the tray deck 40 so that liquid must spill over the weir to enter the inlet 56 of the upstream downcomer 48. In addition, two weirs 74 could be utilized, with one positioned at the edge of the outlet end 44 of tray deck 40 and the other positioned between the downcomer inlets 56 and 58. In a further variation, orifices (not shown) can be placed in the partition wall 52 to allow a portion of the liquid in the upstream downcomer 48 to flow into the downstream downcomer 50.

In operation, liquid flows from the inlet end 42 to the outlet end 44 of the tray deck 40 and at least a first part of the liquid enters the inlet 56 of the upstream downcomer 48. At least some of the first part of liquid is conveyed downwardly through the upstream downcomer and is discharged through the outlet 60 onto the underlying tray deck. Advantageously, the liquid is discharged with a significant momentum vector in the direction of the downstream downcomer to facilitate liquid mixing, reduce the downward liquid momentum, and shield the downstream downcomer discharge outlet 62 from vapor entry. Optionally, some of the first part of liquid in the upstream downcomer 48 passes through the orifices (not shown) and enters the downstream downcomer 50 for downward passage therethrough and discharge onto underlying tray deck. When liquid flow rates increase to a sufficient level, the weir 74 causes liquid to accumulate on the tray deck and a second part of the liquid ultimately overflows the weir 74 and enters the downstream downcomer. As liquid is accumulating and flowing across the tray deck 40, vapor passes upwardly through the apertures 47 in the tray deck and interacts with the liquid on the tray deck.

It can be seen that the inclined upstream downcomer 48 provides greater area above the tray for vapor flow and vapor-liquid interaction than would be available if it extended vertically downward. Because the upstream downcomer 48 extends downwardly to the liquid level on the underlying tray, it is able to shield the liquid in the upstream downcomer 48 so that the vapor flow does not carry the discharged liquid away from the tray deck 40 and thereby interfere with the desired vapor-liquid interaction on the tray deck. In addition, the inclined inlet wall 54 disrupts the downward momentum of the liquid and provides it with a rearward momentum to reduce the incidence of liquid weeping through the vapor flow apertures on the tray deck as a result of such downward momentum and to create a curtain of liquid that impedes vapor entry into the downstream downcomer 50. Moreover, the constricted discharge outlet 60 allows liquid to accumulate within the upstream downcomer 48 and pass through the optional orifices (not shown) or overflow the weir 74 and enter the downstream downcomer 50, thereby facilitating the liquid seal necessary to resist upward vapor flow through the downstream downcomer.

Figure 9:
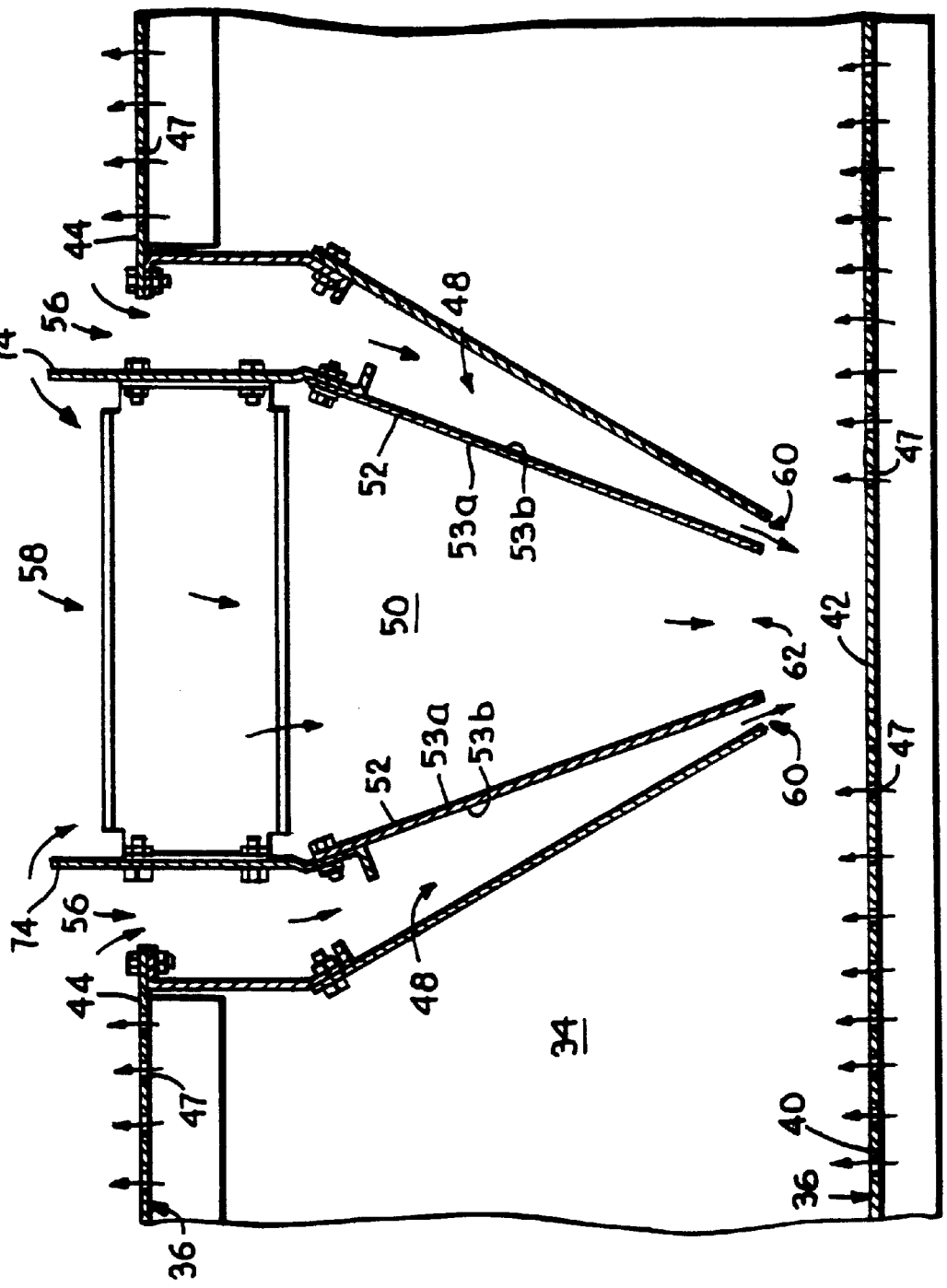
FIG. 9 is a fragmentary side elevation view, similar to that shown in FIG. 5, but illustrating a center downcomer portion of a two-pass tray.

While the invention has been described with respect to a single pass tray, the invention can be readily adapted for use with multiple pass trays such as is illustrated in FIG. 9 wherein the center downcomer portion of a two-pass tray is shown. This is contemplated by and within the scope of the invention.

It will of course be appreciated that the downcomer of the present invention can be used in combination with other tray features such as a raised liquid receiving area and/or louvres or other vapor flow apertures designed to limit while permitting vapor flow through the liquid receiving area.

From the foregoing, it will be seen that this invention is one well adapted to attain all the ends and objects hereinabove set forth together with other advantages that are inherent to the structure.

It will be understood that certain features and subcombinations are of utility and may be employed without reference to other features and subcombinations. This is contemplated by and is within the scope of the claims.

Having thus described the invention, what is claimed is:

1. A vapor-liquid contact tray comprising:
   a tray deck having at least one opening for removing liquid from an upper surface of the tray deck and a plurality of apertures for allowing vapor to flow upwardly through the tray deck to interact with said liquid on the upper surface;
   a least one upstream downcomer extending downwardly at said opening in the tray deck and having an inlet at an upper end to receive at least a portion of the liquid entering said opening from the tray deck and a lower discharge outlet through which at least part of said portion of the liquid exits the upstream downcomer;
   a downstream downcomer extending downwardly at said opening in the tray deck and having an upper inlet for entry of a second portion of liquid into the downstream downcomer and a lower discharge outlet through which said second portion of liquid exits the downstream downcomer, said lower discharge outlet of the downstream downcomer being positioned above the lower discharge outlet of the upstream downcomer;
   a partition wall forming at least a portion of an inlet wall of said downstream downcomer and separating said downstream downcomer from said upstream downcomer along at least a portion of the length of the downstream and upstream downcomers, said inlet wall of the downstream downcomer being inclined at a preselected angle of inclination to a vertical axis so that the lower discharge outlet of the downstream downcomer has a smaller cross-sectional area than the upper inlet of the downstream downcomer; and
   a second inlet wall defining a portion of said upstream downcomer, said second inlet wall being inclined downwardly toward said partition wall so that the outlet of the upstream downcomer has a smaller cross-sectional area than the inlet of the upstream downcomer.

2. The vapor-liquid contact tray as in claim 1, wherein said inlet wall of the upstream downcomer is selected from the group consisting of planar, curved, semi-conical, and multi-segmented chordal.

3. The vapor-liquid contact tray as in claim 1, wherein said inlet wall of the downstream downcomer is selected from the group consisting of planar, curved, semi-conical, and multi-segmented chordal.

4. The vapor-liquid contact tray as in claim 1, including at least one plate containing liquid flow openings positioned at the lower discharge outlet of the upstream and/or downstream downcomer.

5. A mass transfer column comprising:
   an external shell defining an interior region open to the flow of vapor and liquid streams; and
   a plurality of generally horizontally disposed and vertically spaced apart trays positioned in said open interior region to facilitate contact between the vapor and liquid when flowing within the interior region of the column,
   at least some of said trays comprising:
   a tray deck having at least one opening for removing liquid from an upper surface of the tray deck, a plurality of apertures for allowing vapor to flow upwardly through the tray deck to interact with said liquid on the upper surface, and an inlet area for receiving the liquid from above the tray deck;

a least one upstream downcomer extending downwardly at said opening in the tray deck and having an inlet at an upper end to receive at least a first portion of the liquid entering said opening from the tray deck and a lower discharge outlet through which at least part of said first portion of the liquid exits the upstream downcomer;

a downstream downcomer extending downwardly at said opening in the tray deck and having an upper inlet positioned at said opening in the tray deck for entry of a second portion of liquid into the downstream downcomer and a lower discharge outlet through which said second portion of liquid exits the downstream downcomer onto the inlet area of an underlying tray deck, said lower discharge outlet of the downstream downcomer being positioned above the lower discharge outlet of the upstream downcomer;

a partition wall forming at least a portion of an inlet wall of said downstream downcomer and separating said downstream downcomer from said upstream downcomer along at least a portion of the length of the downstream and upstream downcomers, said inlet wall of the downstream downcomer being inclined at a preselected angle of inclination to a vertical axis so that the lower discharge outlet of the downstream downcomer has a smaller cross-sectional area than the upper inlet of the downstream downcomer;

a weir positioned at said opening in the tray deck and separating the upper inlets of the upstream and downstream downcomers; and a second inlet wall defining a portion of said upstream downcomer, said second inlet wall being inclined downwardly toward said partition wall so that the outlet of the upstream downcomer has a smaller cross-sectional area than the inlet of the upstream downcomer.

6. The mass transfer column as in claim 5, wherein the discharge outlet of the upstream downcomer is positioned so that said at least part of said first portion of the liquid exits onto the inlet area of the underlying tray deck.

7. The mass transfer column as in claim 5, wherein the inlet area of the underlying tray deck does not contain said apertures.

8. The mass transfer column as in claim 5, wherein said second portion of liquid exiting the downstream downcomer includes another part of said first portion of liquid entering the opening in the tray deck.

9. The mass transfer column as in claim 5, wherein said inlet wall of the upstream downcomer is selected from the group consisting of planar, curved, semi-conical, and multi-segmented chordal.

10. The mass transfer column as in claim 9, wherein said inlet wall of the downstream downcomer is selected from the group consisting of planar, curved, semi-conical, and multi-segmented chordal.

11. The mass transfer column as in claim 5, including a second upstream downcomer positioned at said opening on a side of the downstream downcomer opposite from said first mentioned upstream downcomer, and wherein a second partition wall separates the downstream downcomer from the second upstream downcomer along at least a portion of their lengths.

12. The mass transfer column as in claim 5, including at least one plate containing liquid flow openings positioned at the lower discharge outlet of the upstream and/or downstream downcomer.

13. A mass transfer column comprising:

an external shell defining an interior region open to the flow of vapor and liquid streams; and a plurality of generally horizontally disposed and vertically spaced apart trays positioned in said open interior region to facilitate contact between the vapor and liquid when flowing within the interior region of the column, at least some of said trays comprising:

a tray deck having at least one opening for removing liquid from an upper surface of the tray deck, a plurality of apertures for allowing vapor to flow upwardly through the tray deck to interact with said liquid on the upper surface, and an inlet area for receiving the liquid from above the tray deck;

a least one upstream downcomer extending downwardly at said opening in the tray deck and having an inlet at an upper end to receive at least a first portion of the liquid entering said opening from the tray deck and a lower discharge outlet through which at least part of said first portion of the liquid exits the upstream downcomer;

a downstream downcomer extending downwardly at said opening in the tray deck and having a lower discharge outlet through which a second portion of liquid exits the downstream downcomer onto the inlet area of an underlying tray deck;

a partition wall separating said downstream downcomer from said upstream downcomer along at least a portion of the length of the downstream and upstream downcomers;

an inlet wall defining a portion of said upstream downcomer, said inlet wall being inclined downwardly toward said partition wall; and at least one deflector positioned below the discharge outlet of the upstream downcomer to deflect the downward momentum of said at least part of said first portion of the liquid exiting the discharge outlet.

14. A vapor-liquid contact tray comprising:

a tray deck having at least one opening for removing liquid from an upper surface of the tray deck and a plurality of apertures for allowing vapor to flow upwardly through the tray deck to interact with said liquid on the upper surface;

a first upstream downcomer extending downwardly at said opening in the tray deck and having an inlet at an upper end to receive at least a portion of the liquid entering said opening from the tray deck and a lower discharge outlet through which at least part of said portion of the liquid exits the upstream downcomer;

a downstream downcomer extending downwardly at said opening in the tray deck and having an upper inlet for entry of a second portion of liquid into the downstream downcomer and a lower discharge outlet through which said second portion of liquid exits the downstream downcomer;

a first partition wall forming at least a portion of a first inlet wall of said downstream downcomer and separating said downstream downcomer from said first upstream downcomer along at least a portion of the length of the downstream and first upstream downcomers, said first inlet wall of the downstream downcomer being inclined at a preselected angle of inclination to a vertical axis so that the lower discharge outlet of the downstream downcomer has a smaller cross-sectional area than the upper inlet of the downstream downcomer;

a second inlet wall defining a portion of said upstream downcomer, said second inlet wall being inclined downwardly toward said first partition wall so that the outlet of the first upstream downcomer has a smaller cross-sectional area than the inlet of the first upstream downcomer;

a second upstream downcomer positioned at said opening on a side of the downstream downcomer opposite from said first upstream downcomer; and a second partition wall forming at least a portion of another inlet wall of said downstream downcomer and separating the downstream downcomer from the second upstream downcomer along at least a portion of their lengths.

15. The vapor-liquid contact tray as in claim 14, wherein said second upstream downcomer has an inlet at an upper end to receive a third portion of the liquid and a lower discharge outlet through which at least part of said third portion of liquid exits the second upstream downcomer, and including a third inlet wall which defines a portion of said second upstream downcomer, said third inlet wall being inclined downwardly toward said second partition wall so that the outlet of the second upstream downcomer has a smaller cross-sectional area than the inlet of the second upstream downcomer.

16. A mass transfer column comprising:

an external shell defining an interior region open to the flow of vapor and liquid streams; and a plurality of generally horizontally disposed and vertically spaced apart trays positioned in said open interior region to facilitate contact between the vapor and liquid when flowing within the interior region of the column, at least some of said trays comprising:

a tray deck having at least one opening for removing liquid from an upper surface of the tray deck, a plurality of apertures for allowing vapor to flow upwardly through the tray deck to interact with said liquid on the upper surface, and an inlet area for receiving the liquid from above the tray deck;

a first upstream downcomer extending downwardly at said opening in the tray deck and having an inlet at an upper end to receive at least a first portion of the liquid entering said opening from the tray deck and a lower discharge outlet through which at least part of said first portion of the liquid exits the upstream downcomer;

a downstream downcomer extending downwardly at said opening in the tray deck and having an upper inlet for entry of a second portion of liquid into the downstream downcomer and a lower discharge outlet through which said second portion of liquid exits the downstream downcomer onto the inlet area of an underlying tray deck;

a first partition wall forming at least a portion of a first inlet wall of said downstream downcomer and separating said downstream downcomer from said first upstream downcomer along at least a portion of the length of the downstream and first upstream downcomers, said first inlet wall of the downstream downcomer being inclined at a preselected angle of inclination to a vertical axis so that the lower discharge outlet of the downstream downcomer has a smaller cross-sectional area than the upper inlet of the downstream downcomer;

a second inlet wall defining a portion of said first upstream downcomer, said second inlet wall being inclined downwardly toward said first partition wall so that the outlet of the first upstream downcomer has a smaller cross-sectional area than the inlet of the upstream downcomer;

a second upstream downcomer positioned at said opening on a side of the downstream downcomer opposite from said first upstream downcomer; and a second partition wall forming at least a portion of another inlet wall of said downstream downcomer and separating the downstream downcomer from the second upstream downcomer along at least a portion of their lengths.

17. The mass transfer column as in claim 16, wherein said second upstream downcomer has an inlet at an upper end to receive a third portion of the liquid and a lower discharge outlet through which at least part of said third portion of liquid exits the second upstream downcomer, and including a third inlet wall which defines a portion of said second upstream downcomer, said third inlet wall being inclined downwardly toward said second partition wall so that the outlet of the second upstream downcomer has a smaller cross-sectional area than the inlet of the second upstream downcomer.

* * * * *